(12) United States Patent
Lee et al.

(10) Patent No.: US 7,429,367 B2
(45) Date of Patent: Sep. 30, 2008

(54) METHOD FOR PRODUCING IMPROVED CERIUM OXIDE ABRASIVE PARTICLES AND COMPOSITIONS INCLUDING SUCH PARTICLES

(75) Inventors: Dong Jun Lee, Seoul (KR); Jae Hyun So, Seoul (KR); Kyoung Moon Kang, Gwangmyeong (KR); Nam Soo Kim, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 11/048,858

(22) Filed: Feb. 3, 2005

(65) Prior Publication Data

US 2006/0013752 A1    Jan. 19, 2006

(30) Foreign Application Priority Data

Jul. 15, 2004    (KR) .................. 10-2004-0055095

(51) Int. Cl.
*B24B 1/00*    (2006.01)
*C01F 17/00*    (2006.01)
*C09G 1/02*    (2006.01)
*C09K 3/14*    (2006.01)

(52) U.S. Cl. .............. 423/263; 106/3; 451/28; 438/692; 438/693; 51/309

(58) Field of Classification Search .......... 423/263; 106/3; 451/28; 438/692, 693; 51/309
See application file for complete search history.

(56) References Cited

U.S. PATENT DOCUMENTS 6,120,571 A * 9/2000 Aihara et al. .............. 51/309
6,221,118 B1 * 4/2001 Yoshida et al. ............. 51/309
6,615,499 B1 * 9/2003 Matsuzawa et al. ......... 51/309
6,689,178 B2 * 2/2004 Ito et al. .................... 51/307
6,863,700 B2 * 3/2005 Yoshida et al. ............. 51/309
6,946,009 B2 * 9/2005 Ito et al. .................... 51/307
2006/0150526 A1 * 7/2006 Ota et al. ................... 51/307

FOREIGN PATENT DOCUMENTS

| JP | 10106989 | 4/1998 |
|---|---|---|
| JP | 10106990 | 4/1998 |
| JP | 10106991 | 4/1998 |
| JP | 10106992 | 4/1998 |
| JP | 10-152673 | 6/1998 |
| KR | 10-2005-0018754 A | 8/2004 |
| WO | 00/73211 | 12/2000 |

OTHER PUBLICATIONS

Korean Office Action dated Dec. 13, 2005 and English translation.

* cited by examiner

*Primary Examiner*—Timothy C Vanoy
(74) *Attorney, Agent, or Firm*—Harness, Dickey & Pierce, PLC

(57) ABSTRACT

Provided are methods for manufacturing improved cerium oxide abrasives suitable for forming slurry compositions suitable for CMP processes. The cerium oxide abrasives are produced by the heat treatment of a mixture of a cerium precursor compound under conditions that produce primary cerium oxide particles that are incorporated in larger secondary abrasive particles. The structure of the primary cerium oxide particles and/or the presence of incompletely oxidized cerium within the secondary abrasive particle tend to reduce its mechanical strength, thereby reducing the likelihood of damaging a substrate surface during a CMP process utilizing such abrasives.

37 Claims, 11 Drawing Sheets

62

62

METHOD FOR PRODUCING IMPROVED CERIUM OXIDE ABRASIVE PARTICLES AND COMPOSITIONS INCLUDING SUCH PARTICLES

PRIORITY STATEMENT

This application claims priority under 35 U.S.C. § 119 to Korean Patent Application No. 2004-55095, which was filed on Jul. 15, 2004, the contents of which is incorporated herein, in its entirety and for all purposes, by reference.

BACKGROUND OF THE INVENTION

1. Field of the Invention

The invention provides a method for producing improved abrasive particles, a method for producing a slurry including such abrasive particles suitable for use in a CMP (Chemical Mechanical Polishing) process, a method of polishing a semiconductor wafer using such a slurry, and a method of manufacturing a semiconductor device incorporating one or more CMP processes employing the improved abrasive particles.

2. Description of the Related Art

Chemical mechanical polishing (CMP) processes encompass a variety of planarization techniques widely used in most current silicon integrated circuit (IC) fabrication processes for satisfying the local and global planarity constraints imposed by current photolithography methods. CMP processes are used to planarize dielectrics, both for planarizing the insulators between metal levels (commonly referred to as interlevel oxides (ILO) or interlayer dielectrics (ILD)) and for forming shallow trench isolation (STI) structures and for planarizing metal layers such as tungsten and copper for forming the conductive structures in multilevel metal damascene processes. The need for the productivity and performance offered by the various CMP processes will tend to maintain or increase their utilization in advanced IC manufacture.

Depending on the material being removed the CMP processes may employ a range of slurry compositions and abrasive particles for removing the intended material from the surface of a semiconductor wafer. The abrasive particles are frequently selected from metal oxides such as alumina ($Al_2O_3$), silica ($SiO_2$), ceria ($CeO_2$), zirconia ($ZrO_2$), and titania ($TiO_2$), and may include particles having a range of particle sizes. The slurry composition will also include a number of additives, such as surfactants, buffers, complexing agents, viscosity adjusters, acids and/or bases for controlling the pH, to provide a slurry composition that is adapted for a particular application.

The most stable oxide of cerium is cerium dioxide, $CeO_2$, which is also commonly referred to as ceria or, somewhat less frequently, as ceric oxide. When cerium salts are calcined in air or other oxygen-containing environments, this tetravalent Ce(IV) oxide is formed. Cerium (along with the other lanthanides) has one of the highest free energies of formation for an oxide and the resulting cerium oxide, while soluble in mineral acids, can prove difficult to dissolve in the absence of a reducing agent such as hydrogen peroxide. Ceria has the fluorite, $CaF_2$, crystal structure with eight coordinate cations and four coordinate anions and can, therefore, generally be visualized as a cubic close-packed array of metal atoms with oxygen atoms filling all the tetrahedral holes.

Slurry additives can include, for example, quaternary ammonium compounds having the general formula $N(R_1 R_2 R_3 R_4)\}^+X^-$, in which $R_1, R_2, R_3$, and $R_4$ are radicals, and $X^-$ is an anion derivative including halogen elements. The quaternary ammonium compound may be one of $[(CH_3)_3NCH_2CH_2OH]Cl$, $[(CH_3)_3NCH_2CH_2OH]F$, $[(CH_3)_3NCH_2CH_2OH]Br$, $[(CH_3)_3NCH_2CH_2OH]CO_3$, and mixtures thereof. Various pH control agents may also be incorporated as bases, for example, KOH, $NH_4OH$, $[(CH_3)_3NCH_2CH_2OH]OH$ and/or $(CH_3)_4NOH$, and acids, for example HCl, $H_2SO_4$, $H_3PO_4$ and/or $HNO_3$. The slurry may further include a surfactant such as cetyldimethyl ammonium bromide, cetyldimethyl ammonium bromide, polyethylene oxide, polyethylene alcohol or polyethylene glycol.

SUMMARY OF THE INVENTION

Provided is a method of preparing cerium oxide particles, comprising: heating a cerium precursor compound to a heat treatment temperature of between about 710 C and about 760 C under an oxidizing ambient; maintaining the cerium precursor compound at the heat treatment temperature for a treatment period sufficient to obtain a treated cerium compound in which substantially all of the cerium precursor compound has been converted to cerium oxide ($CeO_2$); separating the cerium oxide according to particle size; and forming an aqueous dispersion of cerium oxide particles within a predetermined particle size range. During the preparation of the cerium oxide particles the oxidizing ambient may be a gas mixture including at least about 20 volume percent oxygen and may be maintained at a pressure of at least about 1 atmosphere.

The cerium precursor compound may be selected from a range of cerium compounds including acetates, carbides, carbonates, chlorides, cyanates, bromides, fluorides, oxalates, sulfates, sulfites, and thiosulfates that have a melting point under the oxidation conditions of at least about 715° C. or, more typically, at least about 785° C. Representative cerium precursor compounds include, for example, $Ce_2(CO_3)_3$, $Ce(OH)_4$, $CeC_2$, $Ce(O_2C_2H_3)_3$, $CeBr_3$, $CeCl_3$, $CeF_3$, $CeF_4$, $Ce_2(C_2O_4)_3$, $Ce(SO_4)_2$, $Ce_2(SO_4)_3$ and mixtures thereof in both hydrated and anhydrous forms. If the cerium precursor is being used in its hydrated form, a dehydration step may be incorporated before heating the cerium precursor to the heat treatment temperature.

Once the cerium oxide particles have been produced, they may be separated by size using one or more well known techniques including, for example, centrifugation, sedimentation and filtration and may incorporate mechanical disruption processes for reducing the average size of the cerium oxide particles before or in conjunction with the separation technique.

Also provided is a technique for preparing cerium oxide particles, comprising: heating a cerium precursor compound to a heat treatment temperature of between about 710 C and about 760 C under an oxidizing ambient; maintaining the cerium precursor compound at the heat treatment temperature for a treatment period sufficient to obtain a treated cerium compound in which the oxidation of the cerium is not complete and the cerium precursor compound has been converted to a cerium oxide compound that may be represented by the formula $CeO_x$, wherein $0<x<2$; separating the cerium oxide compound according to particle size; and forming an aqueous dispersion of cerium oxide compound particles within a predetermined particle size range.

During preparation of the cerium oxide compound, the oxidizing ambient utilized may be a gas mixture that includes no more than about 20 volume percent oxygen such as, for example, air diluted with one or more inert gases, and/or is maintained at a pressure of no more than about 1 atmosphere.

The inert gases may include, for example, nitrogen ($N_2$), argon (Ar), or helium (He).

The cerium precursor compound may be selected from a range of cerium compounds including acetates, carbides, carbonates, chlorides, cyanates, bromides, fluorides, oxalates, sulfates, sulfites, and thiosulfates that have a melting point under the oxidation conditions of at least about 715° C. and typically at least about 765° C. Representative cerium precursor compounds include, for example, $Ce_2(CO_3)_3$, $Ce(OH)_4$, $CeC_2$, $Ce(O_2C_2H_3)_3$, $CeBr_3$, $CeCl_3$, $CeF_3$, $CeF_4$, $Ce_2(C_2O_4)_3$, $Ce(SO_4)_2$, and $Ce_4(SO_4)_3$ in both hydrated and anhydrous forms. If the cerium precursor is being used in its hydrated form, a dehydration step may be incorporated before heating the cerium precursor to the heat treatment temperature.

Depending on the heat treatment conditions and the duration of the heat treatment, the cerium precursor may be oxidized to produce a cerium oxide compound $CeO_x$ that satisfies the expression $1<x<2$. Similarly, the heat treatment conditions may be modified to produce a cerium oxide compound $CeO_x$ that satisfies the expression $1<x<1.9$.

Also provided is a technique for utilizing the cerium oxide particles prepared in accord with the methods of the invention in formulating slurry compositions by combining one or more types of the cerium oxide and/or cerium oxide compound abrasive particles, usually provided as a suspension, with an aqueous additive solution in a predetermined proportion. The aqueous additive solution will typically include at least one polymeric acid or a salt thereof, such as polyacrylic acid, polyacrylic-maleic acid and polymethyl vinyl ether-alt maleic acid. When more than one polymeric acid or the salts thereof are utilized, the polymeric acids will tend to have different mean molecular weights and be independently selected from polymeric acids such as the previously noted polyacrylic acid, polyacrylic-maleic acid and polymethyl vinyl ether-alt maleic acid. The additive solution can also include a base, such as sodium hydroxide, potassium hydroxide, ammonium hydroxide and basic amines to adjust the pH of the resulting slurry to a more neutral pH range, e.g., a pH of about 6-8.

Also provided is a technique for planarizing a substrate using such a slurry and the cerium oxide abrasive particles of the invention comprising: placing the substrate on a carrier; urging a primary surface of the substrate against a pad surface while generating relative motion between the substrate and the pad; and applying a slurry composition to the pad so that a portion of the slurry composition is between the primary surface and the pad surface, the slurry composition cooperating with the pad surface to remove an upper portion of the substrate; wherein the slurry composition includes cerium oxide particles, substantially all of which are within a predetermined size range, the cerium oxide particles having been manufactured by heating a cerium precursor compound to a heat treatment temperature of between about 710 C and about 760 C under an oxidizing ambient; maintaining the cerium precursor compound at the heat treatment temperature for a treatment period sufficient to obtain a treated cerium compound in which substantially all of the cerium precursor compound has been converted to cerium oxide ($CeO_2$) or in which the cerium precursor compound has been incompletely oxidized to form a cerium oxide compound ($CeO_x$) wherein x satisfies the expression $0<x<2$, or, in some instances, the expression $1<x<1.9$; separating the cerium oxide according to particle size; forming an aqueous dispersion of cerium oxide particles within a predetermined particle size range; and combining the aqueous dispersion of cerium oxide particles with a second aqueous additive solution in a predetermined proportion to form the slurry composition.

BRIEF DESCRIPTION OF THE DRAWINGS

The invention will become more apparent by describing in detail exemplary embodiments thereof with reference to the attached drawings in which.

Figure 1A:
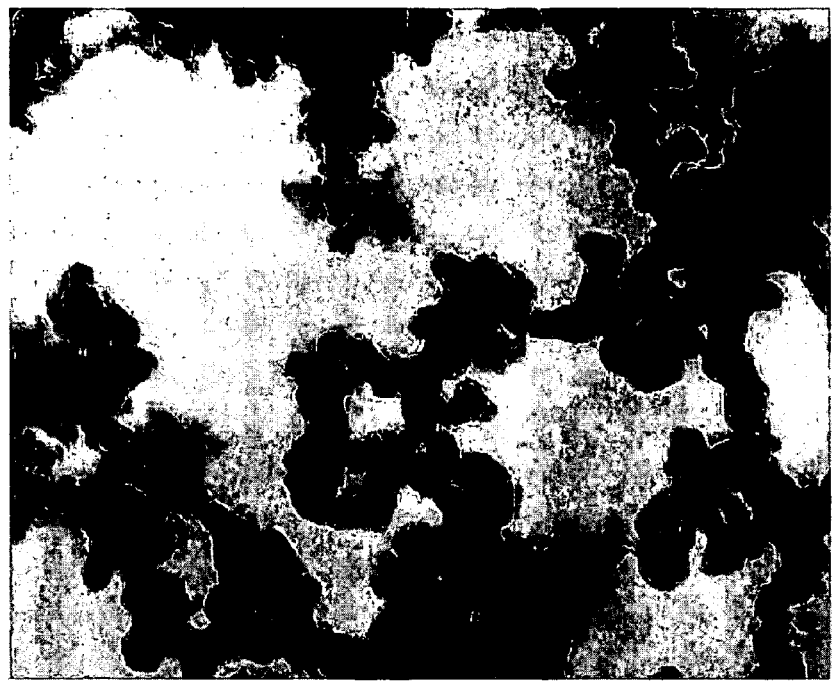
FIGS. 1A and 1B illustrate exemplary silica and ceria abrasive particles.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity.

Those of ordinary skill in the art will also appreciate that a range of alternative configurations have been omitted simply to improve the clarity and reduce the number of drawings. Those of ordinary skill will also appreciate that certain of the various process steps illustrated or described with respect to the exemplary embodiments may be selectively and independently combined to create other methods useful for manufacturing semiconductor devices without departing from the scope and spirit of this disclosure.

DETAILED DESCRIPTION OF EXEMPLARY EMBODIMENTS

Efforts to reduce semiconductor device dimensions and/or increase device density, combined with the development of new interconnect technologies (such as copper and reduced capacitance (also referred to as low K or low ε) polymer based dielectrics) has led to the introduction and rapid development of chemical-mechanical planarization (CMP) technology in semiconductor manufacturing. CMP processes include a wide range of global planarization processes suitable for use in the manufacture of multilevel circuits having feature sizes of 0.5 μm and below. As the device feature size decreases, the RC interconnect delay (a function of the resistance (R) and capacitance (C) of the circuit) tends to increases non-linearly and may dominate gate delay (a function of the transistor switching) as a limitation on the device operating speed. To address the increases in RC interconnect delay, various multilevel metallization (MLM) techniques, in which a series of conductive patterns are separated by dielectric insulating layers, have been developed for improving the scaling factor for interconnection patterns.

In MLM processes, the different metal interconnection patterns are formed on several different planes that are generally isolated from one another by insulating layers, sometimes referred to as interlevel dielectrics (ILD), and selectively interconnected through conductive structures, such as conductive plugs, formed through via holes etched through the interposed ILD. Most of the difficulties associated with MLM structures relate to the associated deposition processes, the alignment and process precision with which the photolithography, patterning and etching processes can be conducted, and the degree of planarization that can be achieved between interconnection patterns. CMP processes provide alternatives to other conventional planarization processes such as reflow, spin-on-glass (SOG), bias sputtering, dry etching, and etch back processes. Appropriate CMP processes will tend to provide improved versatility, simplicity and better global planarization for a wide range of materials than can be achieved with the conventional planarization processes.

In addition to addressing the need for global planarization, CMP processes have proven useful in forming patterns from materials, such as copper, that are difficult to etch and pattern using conventional dry etching methods. For example, the "damascene" or "inlaid approach" deposits a blanket copper layer on a substrate layer, such as silica, that has previously been patterned and etched to form trenches corresponding to the desired metal pattern. The conductive pattern remains within the trenches after a CMP process is applied to remove the upper portion of the copper layer.

CMP processes may also provide for the synergistic combination of both tribological and chemical effects to planarize conductive and insulating materials such as copper, tungsten and other metals, silica and other oxides and nitrides and polymers. In addition to global planarization and relatively high removal or polishing rates, CMP processes can also be adapted to provide some degree of material selectivity (a higher polishing rate of one material compared to another material under the same process conditions), and a high quality surface that is largely free of defects such as scratches, pits and particulate contamination. The CMP process materials, abrasives, additives, etc., can be customized to improve the process performance with respect to the primary material, and sometimes secondary materials, that will be removed from the wafer surface. Typical CMP slurries contain small (<300 nm) abrasive particles at concentrations ranging from about 1 to 10 wt % and several additives (surfactants, stabilizers, complexing agents, etc.) to improve the material removal rate and/or the selectivity of the slurry and/or stabilize the slurry components.

Another consideration in defining CMP processes is the relative hardness and morphology of the abrasive material(s) and the material(s) being removed from the semiconductor wafer surface. For example, low resistivity metals, such as copper and silver, and low K materials desirable for higher performance interconnection patterns, are typically much softer than the conventional interconnection materials such as tungsten and polysilium. For example, the micro-hardness of copper is about 80 kg/mm$^2$ (Mohs scale equivalent of about 2.5) compared with abrasive materials such as silica and ceria (about 1200 kg/mm$^2$ [Mohs scale 6-7]), and alumina (about 2000 kg/mm$^2$ [Mohs scale 9]). The CMP of soft surface materials using such hard abrasive-based slurries tends to increase the likelihood of producing surface scratches and/or pits on the planarized surface.

Another type of defect seen in CMP processes, particularly when planarizing a surface having materials of varying hardness, such as a combination of copper and silicon oxide, is "dishing" in which a central portion of the exposed width of the softer material is removed more rapidly than the edge portions, thereby producing a concave surface or trough. Dishing tends to increase the resistance of the resulting conductive pattern and, as a result of the lack of planarity, can lead to increases in the particulate contamination as well.

The abrasive particles used in more demanding CMP possesses tend to have an average particle size of less than about 300 nm based on the general observation that, all other parameters being equal, smaller abrasive particles tend to leave fewer defects on the polished surface. However, smaller abrasive particles can also be associated with lower material removal rates, reducing the process throughput, and tend to be more difficult to remove from the polished surface after completion of the CMP process, increasing the chance of particulate contamination and/or complicating the clean-up processes.

Figure 1B:
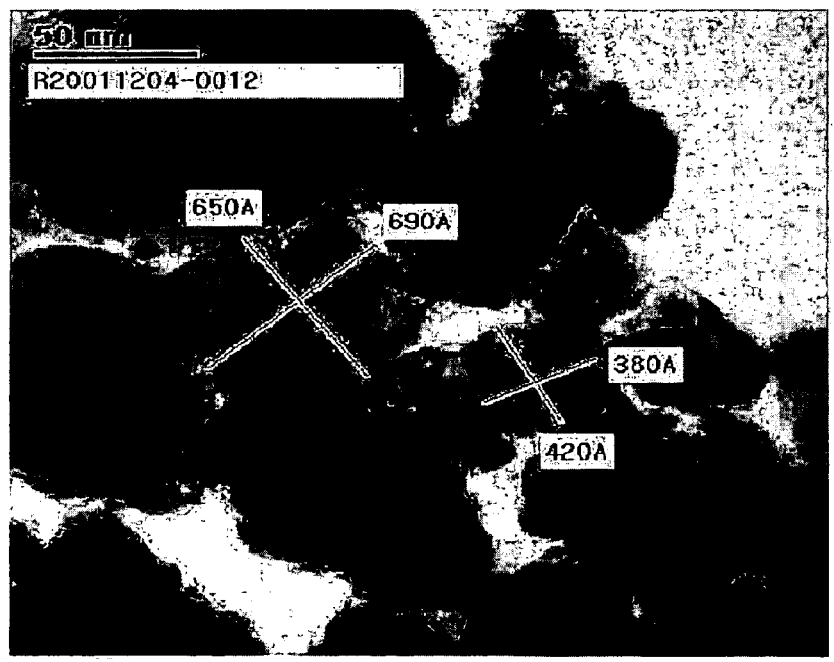

As illustrated in FIGS. 1A and 1B, silica and ceria abrasive particles tend to exhibit variations in morphology. The silica particles, as shown in FIG. 1A, tend to be smaller and exhibit a more amorphous structure and a more rounded configuration than the ceria particles as illustrated in FIG. 1B. Conversely, the ceria particles, as shown in FIG. 1B, tend to be larger and have a higher degree of crystallinity, both parameters that will tend to increase the material removal rate and increase the likelihood of scratches. These tendencies are somewhat offset, however, by the improved silicon oxide/silicon nitride selectivity exhibited by CMP slurries including ceria abrasive particles when compared with slurries including silica abrasive particles and improved planarization characteristics. Accordingly, CMP slurries incorporating ceria abrasives are becoming more widely used in the manufacture of semiconductor devices, particularly those devices with demanding design rules of 0.15 μm and below.

Figure 2A:
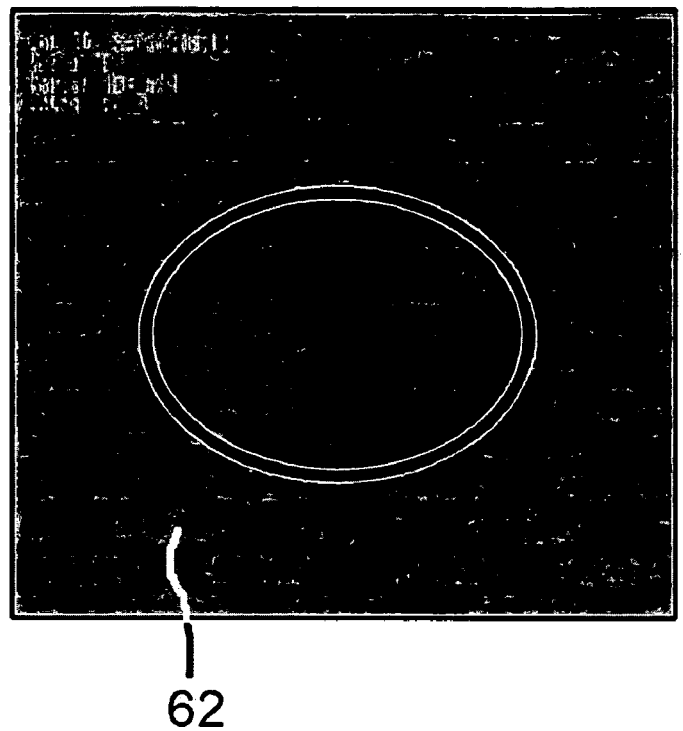
FIGS. 2A and 2B illustrate polishing defects resulting from the use of silica and ceria abrasive particles, respectively.
Figure 2B:
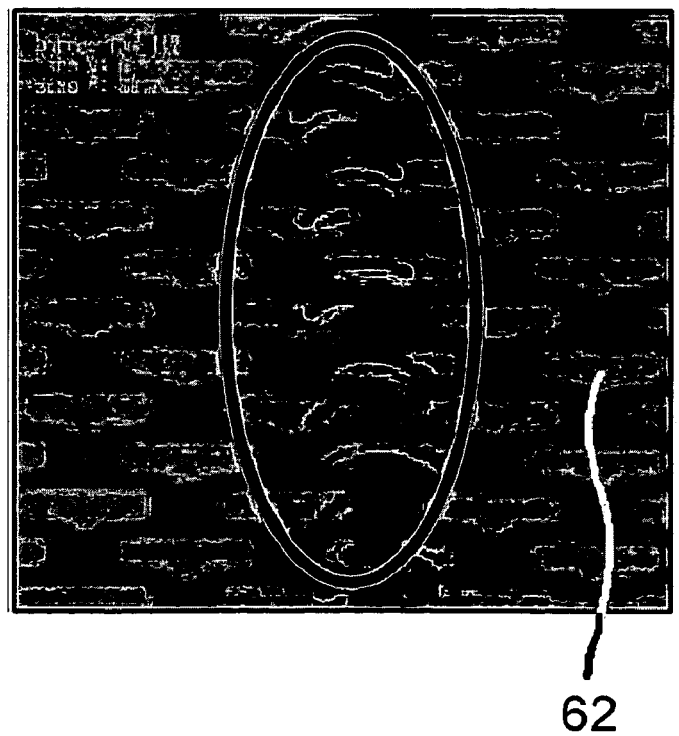

As suggested above, however, and as illustrated in FIGS. 2A and 2B, the increased size and crystallinity of the ceria abrasive particles tends to increase the number and severity of CMP-induced defects on the substrate surface. As illustrated in FIG. 2A, the circled region of the semiconductor wafer surface pattern 62 includes a scratch produced during a CMP process utilizing a silica-based CMP slurry. As illustrated in FIG. 2B, however, a scratch in the circled region of the semiconductor wafer surface pattern 62 resulting from the use of a corresponding ceria-based CMP slurry is much more severe. The CMP slurries incorporating ceria abrasive particles, therefore, tend to exhibit a greater yield loss and reduced reliability relative to those prepared with the silica abrasive particles.

Figure 4A:
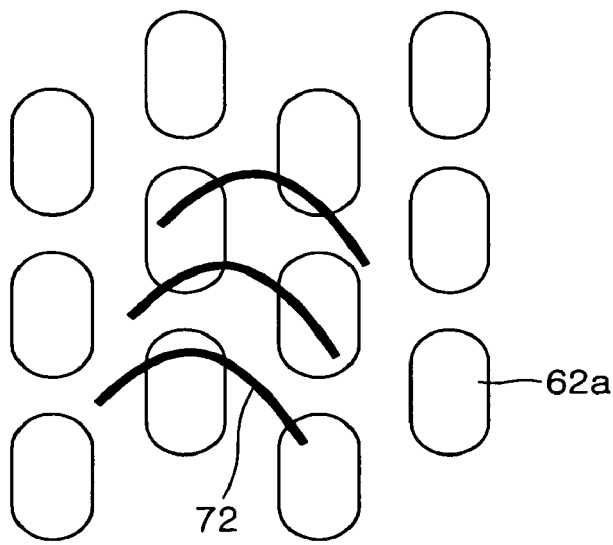
FIGS. 4A-4C illustrate the effect of identical scratches across semiconductor devices of varying size.
Figure 4B:
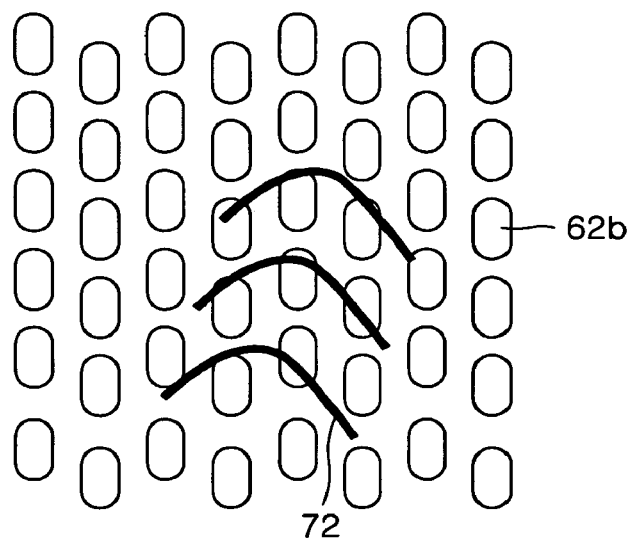
Figure 4C:
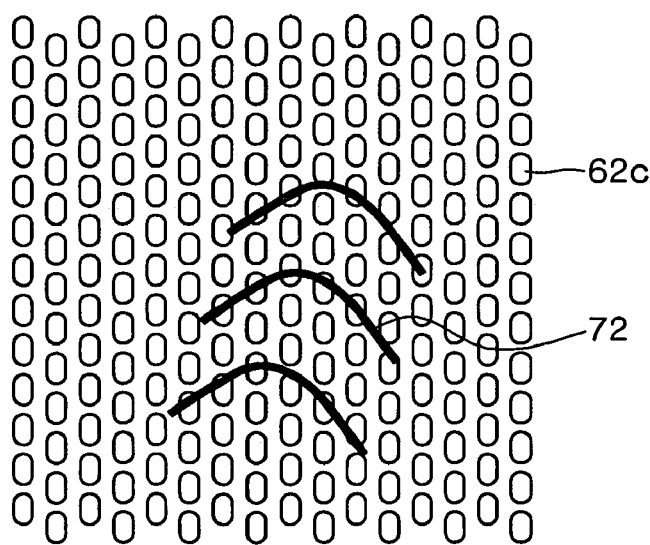

As illustrated in FIGS. 4A-4C, the effect of a polishing defect 72 generated on the surface of a semiconductor wafer during a CMP process will vary according to the relative size and placement of the individual chips 62a, 62b, 62c, that represent devices designed and manufactured according to design rules of decreasing size. Even though the defect size is same, the number of the chips affected in a given area increases.

One method for addressing the increase in polishing defects associated with larger particles is to remove the larger particles selectively, typically using a filter, before applying the slurry to the polishing surface. The nature of the slurry compositions, however, coupled with limitations of conventional filtering technology, tend to complicate the ability to remove the objectionable larger particles while effectively passing substantially all of the appropriately sized particles.

The invention addresses this issue by improving the performance of ceria abrasive particles by altering the polishing particle microstructure by controlling the oxidation of a cerium precursor compound and the dispersion of the cerium oxide secondary particles. Ceria particles prepared according to this method, compared with conventional ceria particles, provide increased polishing speed while also tending to reduce the number of polishing defects such as scratches and related problems.

Figure 5:
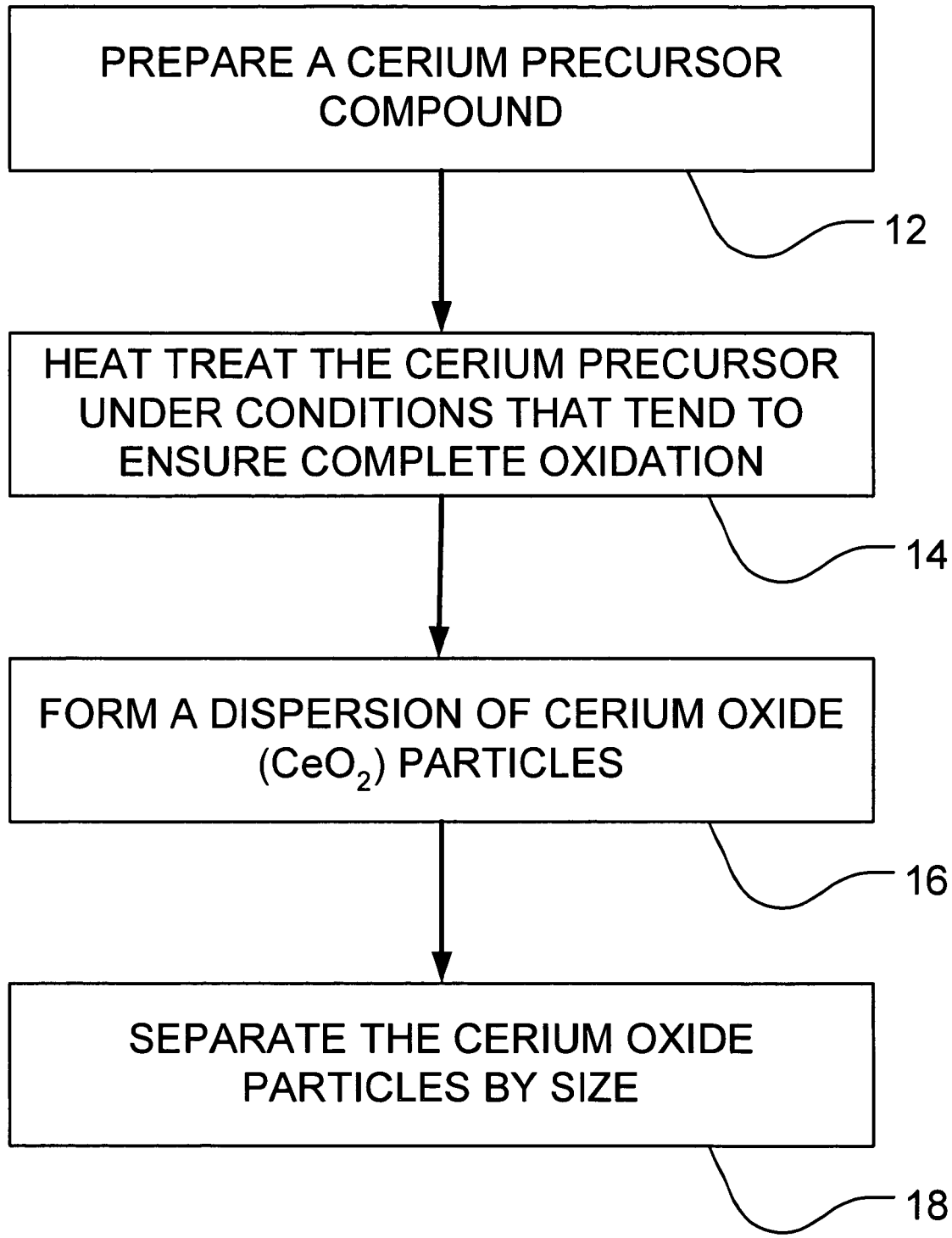
FIG. 5 is a flowchart illustrating an exemplary method of forming $CeO_x$ particles according to the invention.

As illustrated in the flowchart provided in FIG. 5, ceria oxide polishing particles may be produced according to the invention by a first exemplary method that includes preparing 12 and heating 14 at least one cerium precursor compound to a heat treatment temperature of between about 710° C. and about 760° C. under an oxidizing atmosphere.

The heat treatment step will typically be conducted in a furnace or a reactor having a heater capable of obtaining and maintaining the desired heat treatment temperature. The reactor may also be capable of selectively controlling the composition of the atmosphere within the reactor and/or controlling the pressure of the atmosphere within the reactor for the duration of the heat treatment cycle. Depending on the nature of the cerium precursor compounds and the other process parameters, the heat treatment duration may be between about 2.5 and about 5 hours to obtain the desired degree of oxidation within the cerium precursor compound. In this exemplary embodiment, the heat treatment is typically maintained for a time sufficient to oxidize substantially all of the cerium completely to form $CeO_2$.

The cerium precursor compound(s) should generally be selected to have an individual or combined melting point that is higher than the heat treatment temperature by at least the margin of temperature control provided by the reactor to maintain a solid phase reaction. The cerium precursor compound may include one or more of $Ce_2(CO_3)_3$, $Ce(OH)_4$, $CeC_2$, $Ce(O_2C_2H_3)_3 \cdot xH_2O$, $CeBr_3$, $Ce_2(CO_3)_3 \cdot xH_2O$, $CeCl_3 \cdot xH_2O$, $CeCl_3$, $CeF_3$, $CeF_4$, $Ce_2(C_2O_4)_3$, $Ce(SO_4)_2$ and/or $Ce_2(SO_4)_3$ and may be present as hydrated and/or anhydrous compounds.

As illustrated in FIG. 5, after the heat treatment has been completed, the cerium oxide may be dispersed 16 in an aqueous solution to form a dispersion or suspension. The aqueous solution may be formed by mixing de-ionized (D.I.) water with a dispersion agent, which may be one or more anionic organic dispersion agents, cationic organic dispersion agents or non-ionic organic dispersion agents. As also illustrated in FIG. 5, the mean diameter size of the cerium oxide particles is controlled to within a desired particulate size range by filtering or otherwise separating 18 the dispersion by particle size.

If filtering is utilized for separating the particles by size, before conducting the filtering process, the dispersion may be subjected to a centrifugation step for removing larger particles. Once substantially all of the larger particles have been removed, dispersion can be filtered with the filtrate of the sized cerium oxide particle dispersion subsequently being combined with similar or modified aqueous solutions and/or dispersions to prepare a cerium oxide dispersion in which the majority of the cerium oxide particles exhibit a desired particle size range.

Figure 3A:
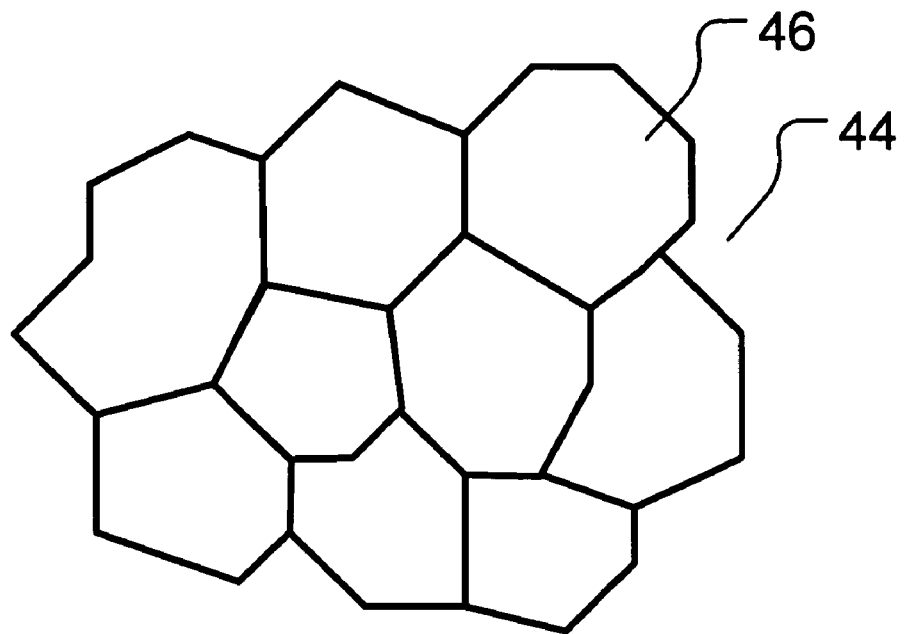
FIG. 3A represents a composite ceria abrasive particle prepared according to the invention incorporating a plurality of primary cerium oxide particles.

As illustrated in FIG. 3A, the secondary cerium oxide polishing particle 44 tends to include a number of primary cerium oxide particles 46 that may be substantially crystalline. Control over the relative sizing of these primary cerium oxide particles 44 and the strength of their attachment within the secondary polishing particle have a significant impact on the performance of CMP slurry compositions incorporating such polishing particles. As a result, secondary cerium oxide particles prepared according to the exemplary methods disclosed herein will tend to fracture more easily upon contact with a structure on the surface of a semiconductor wafer undergoing a CMP process, thereby reducing the effective size of the abrasive particle and reducing the likelihood of scratching the surface of the semiconductor wafer undergoing planarization.

Figure 6:
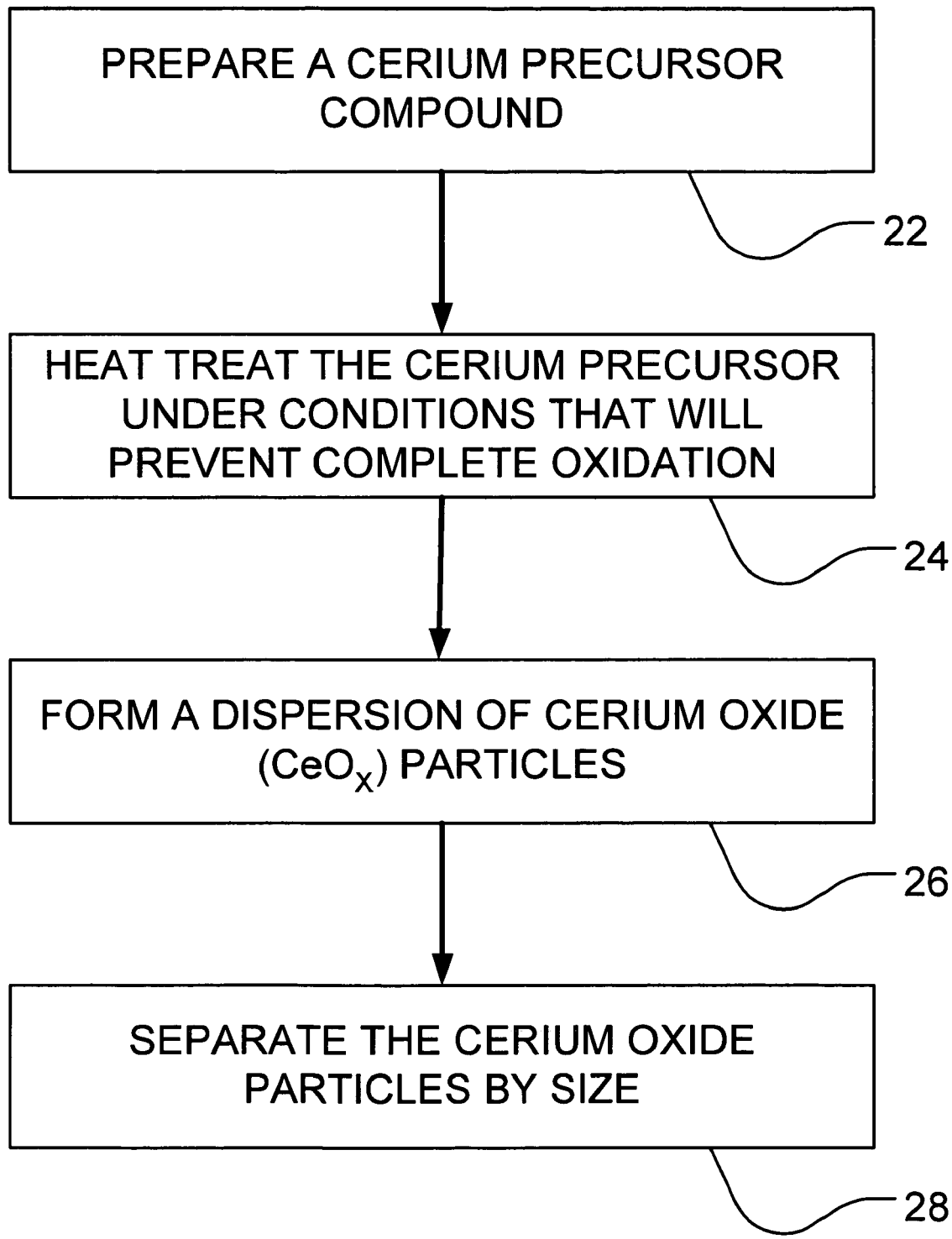
FIG. 6 is a flowchart illustrating another exemplary method $CeO_x$ particles according to the invention.

As illustrated in the flowchart provided in FIG. 6, ceria oxide polishing particles according to the invention may be produced by a second exemplary method that includes preparing 22 and heating 24 at least one cerium precursor compound to a heat treatment temperature of between about 710° C. and about 760° C. under an oxidizing atmosphere in which the oxygen concentration is reduced continuously or periodically in order to suppress the oxidation of the cerium precursor compound(s) within the reactor to ensure incomplete oxidation.

The oxygen concentration may typically be reduced by introducing an inert gas, such as $N_2$, Ar or He, that will act as a diluent for the $O_2$ present in the reactor. Similarly, the partial pressure of the $O_2$ may be reduced by performing the oxidation reaction under a partial vacuum. Another method for reducing the $O_2$ present in the reactor is to introduce a combustible gas, such as $H_2$, that will tend to consume a portion of the $O_2$ as it "burns," but will not tend to introduce any contaminants into the reactor. The technique or techniques for reducing the quantity of oxygen within the reactor may be selected depending on the degree of reduction in the $O_2$ concentration desired and the configuration of the reactor.

The heat treatment step may be conducted in a furnace or a reactor having a heater capable of obtaining and maintaining the heat treatment temperature, selectively controlling the composition of the atmosphere within the reactor and/or controlling the pressure of the atmosphere within the reactor for the duration of the heat treatment cycle. Depending on the nature of the cerium precursor compounds and the other process parameters, the heat treatment duration may be between about 2.5 and about 5 hours to obtain the desired degree of oxidation within the cerium precursor compound. In this exemplary embodiment, the heat treatment is typically maintained for a time sufficient to oxide the cerium only partially to form $CeO_x$, where x satisfies the expression $0<x<2$, or, more typically, $1<x<1.9$.

The cerium precursor compound(s) should generally be selected to have an individual or combined melting point that is higher than the heat treatment temperature by at least the margin of temperature control provided by the reactor to maintain a solid phase reaction. The cerium precursor compound may include one or more of $Ce_2(CO_3)_3$, $Ce(OH)_4$, $CeC_2$, $Ce(O_2C_2H_3)_3 \cdot xH_2O$, $CeBr_3$, $Ce_2(CO_3)_3 \cdot xH_2O$, $CeCl_3 \cdot xH_2O$, $CeCl_3$, $CeF_3$, $CeF_4$, $Ce_2(C_2O_4)_3$, $Ce(SO_4)_2$ and/or $Ce_2(SO_4)_3$.

As illustrated in FIG. 6, after the heat treatment has been completed, the cerium oxide may be dispersed 26 in an aqueous solution to form a dispersion or suspension. The aqueous solution may be formed by mixing de-ionized (D.I.) water with a dispersion agent, which may be one or more anionic organic dispersion agents, cationic organic dispersion agents or non-ionic organic dispersion agents. As also illustrated in FIG. 6, the mean diameter size of the cerium oxide particles is controlled to within a desired particulate size range by filtering or otherwise separating 28 the dispersion by particle size. If filtering is utilized, before filtering the dispersion a centrifugation step may be utilized for removing the larger of the oversize particles. Once substantially all of the larger particles have been removed, the filtrate of the cerium oxide particle dispersion may be combined with similar or modified aqueous solutions and/or dispersions to prepare a cerium oxide dispersion composition in which the majority of the cerium oxide particles exhibit the desired particle size range.

Figure 3B:
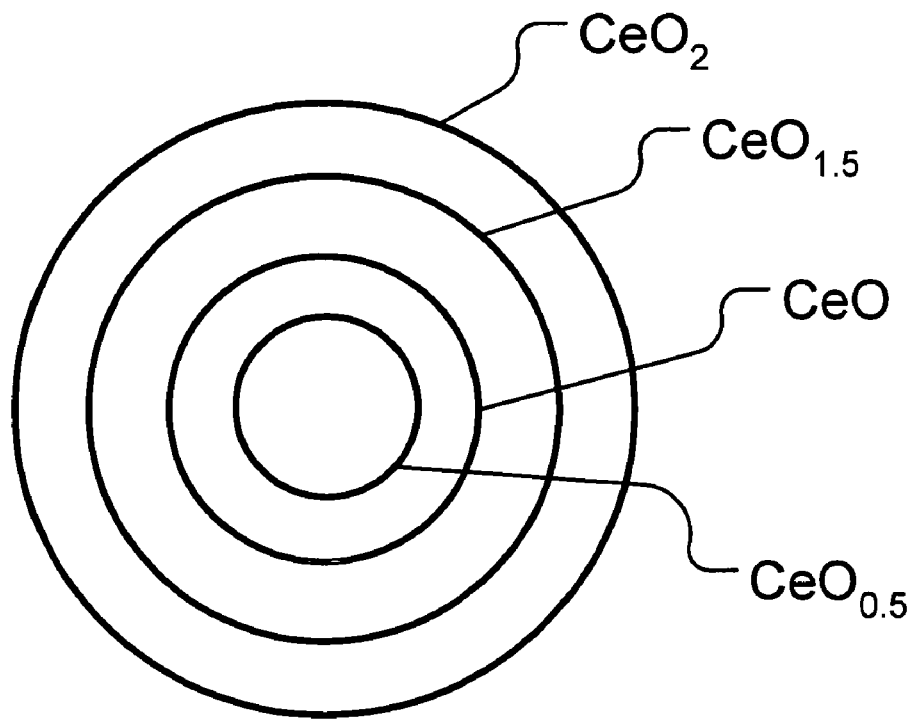
FIG. 3B represents a cerium oxide ($CeO_x$) abrasive particle having radially varying stoichiometry.

As illustrated in FIG. 3B, in an exemplary embodiment of the method according to FIG. 6, the oxidizing gas will diffuse into the particles of the cerium precursor compound and tend to oxidize the cerium atoms it encounters. However, by controlling the duration of the oxidation process, the concentration of the oxidizing gas and/or the partial pressure of the oxidizing gas, the oxidation process can be interrupted prior to completion. As will be appreciated by those skilled in the art, the $CeO_x$ cerium oxide compound will include a range of stoichiometries among the various cerium oxide compound particles and/or within a single cerium oxide compound particle (shown) that may be characterized by an average stoichiometry $CeO_x$ where $2<x$, even though only a small fraction of the actual cerium oxide compound is likely to correspond to that formula.

In one exemplary embodiment of the method, one or more inert gases may be introduced into the reactor to dilute the air entering the reactor and produce a temperature treatment ambient that is between about 10 and about 20 percent oxygen by volume. The volume of inert gas or gases necessary to achieve this reduction in the oxygen concentration will, of course, depend on the flow rate of gases into the reactor and may be adjusted as necessary to maintain the desired concentration. As noted above, a similar effect may be achieved by reducing the pressure within the reactor to between about 0.5 and 0.95 atmospheres, introducing a combustible fuel at a rate sufficient to consume between about 5 and about 50 percent of the oxygen present, or a combination of methods adjusted to obtain the desired oxygen concentration.

Figure 7:
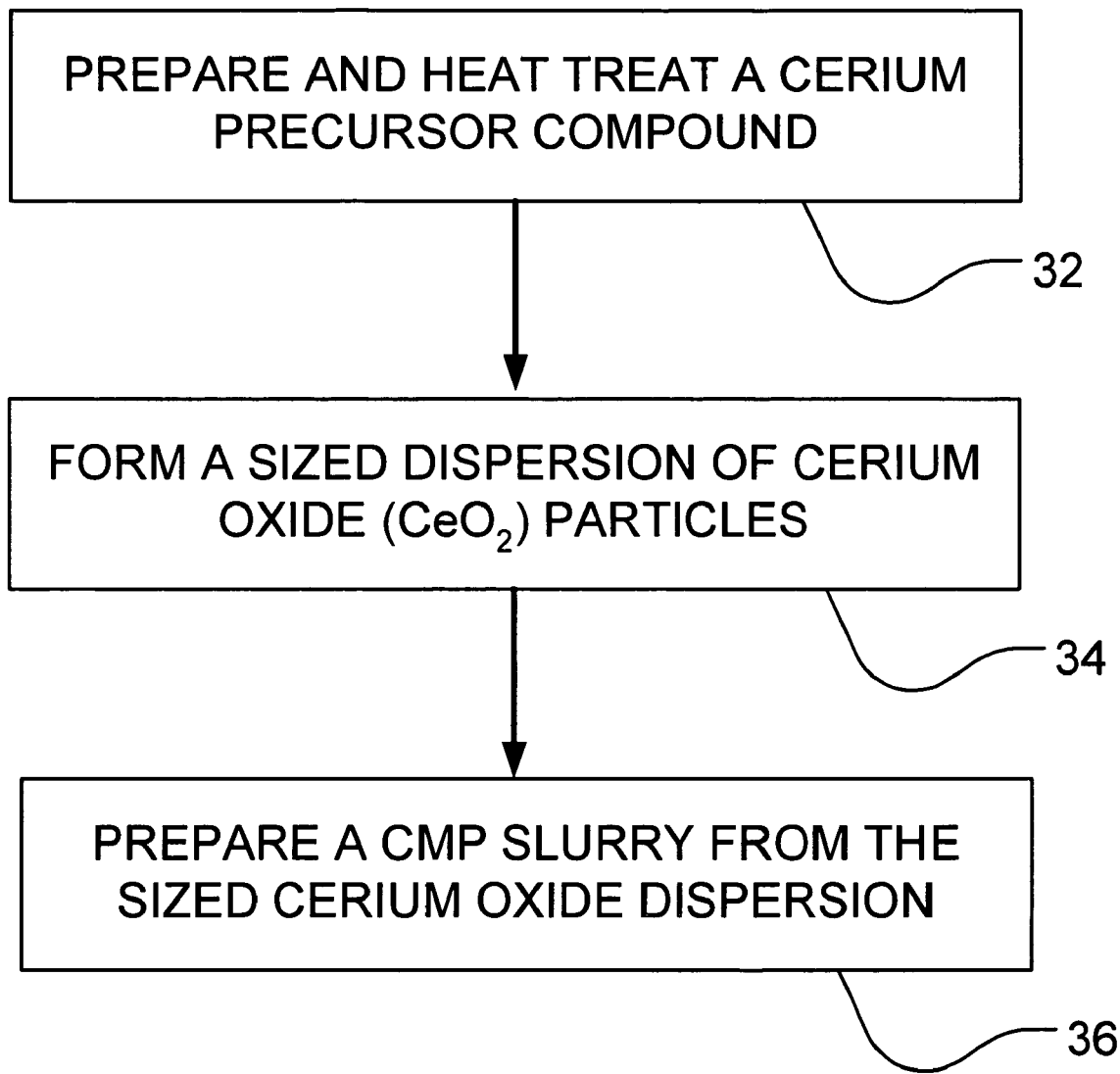
FIG. 7 is a flowchart illustrating an exemplary method of forming a CMP slurry according to the invention.

As illustrated in FIG. 7, either of the exemplary methods outlined above for the preparation of cerium oxide particles 32 having a desired particle size range 34 may be utilized to prepare a dispersion including the selected abrasive particles. This dispersion can then be used to produce an exemplary CMP slurry composition 36 according to the invention that comprises cerium oxide abrasive particles produced by one or both of the exemplary methods described above. The slurry composition will also typically comprise at least a dispersion agent and/or a surfactant.

The use of one or more additives in the slurry composition will tend to improve its stability, polishing rate and/or its selectivity with respect to at least two of the materials that are expected to be present on the semiconductor substrate to which the slurry composition will be applied. The range of additive agents may include a first polymeric acid having a first mean molecular weight, a salt of the first polymeric acid being prepared by a reaction with a first basic material, the second polymeric acid having a second mean molecular weight, a salt of the second polymeric acid being prepared by a reaction with a second basic material, the second mean molecular weight being larger than the first mean molecular weight. The first and second polymeric acids may be independently selected from polyacrylic acid, polyacrylic acid-co-maleic acid or polymethylvinylether-alt-maleic acid.

Similarly, the first and second basic materials may be selected independently from sodium hydroxide, potassium hydroxide, ammonium hydroxide, basic amines and mixtures thereof.

As illustrated in FIG. 7, in step 32, the cerium precursor compound is heated to and maintained at or near the heat treatment temperature of between about 710° C. and about 760° C. under an oxidizing atmosphere for a period sufficient to form generally completely oxidized cerium oxide particles according to the exemplary method described above in connection with FIG. 5. As illustrated in FIG. 7, in step 34, a sized dispersion including the cerium oxide abrasive particles may be formed by dispersing the cerium oxide produced in step 32 in an aqueous solution and separating the particles by size according to the exemplary method described above in connection with FIG. 5.

Figure 8:
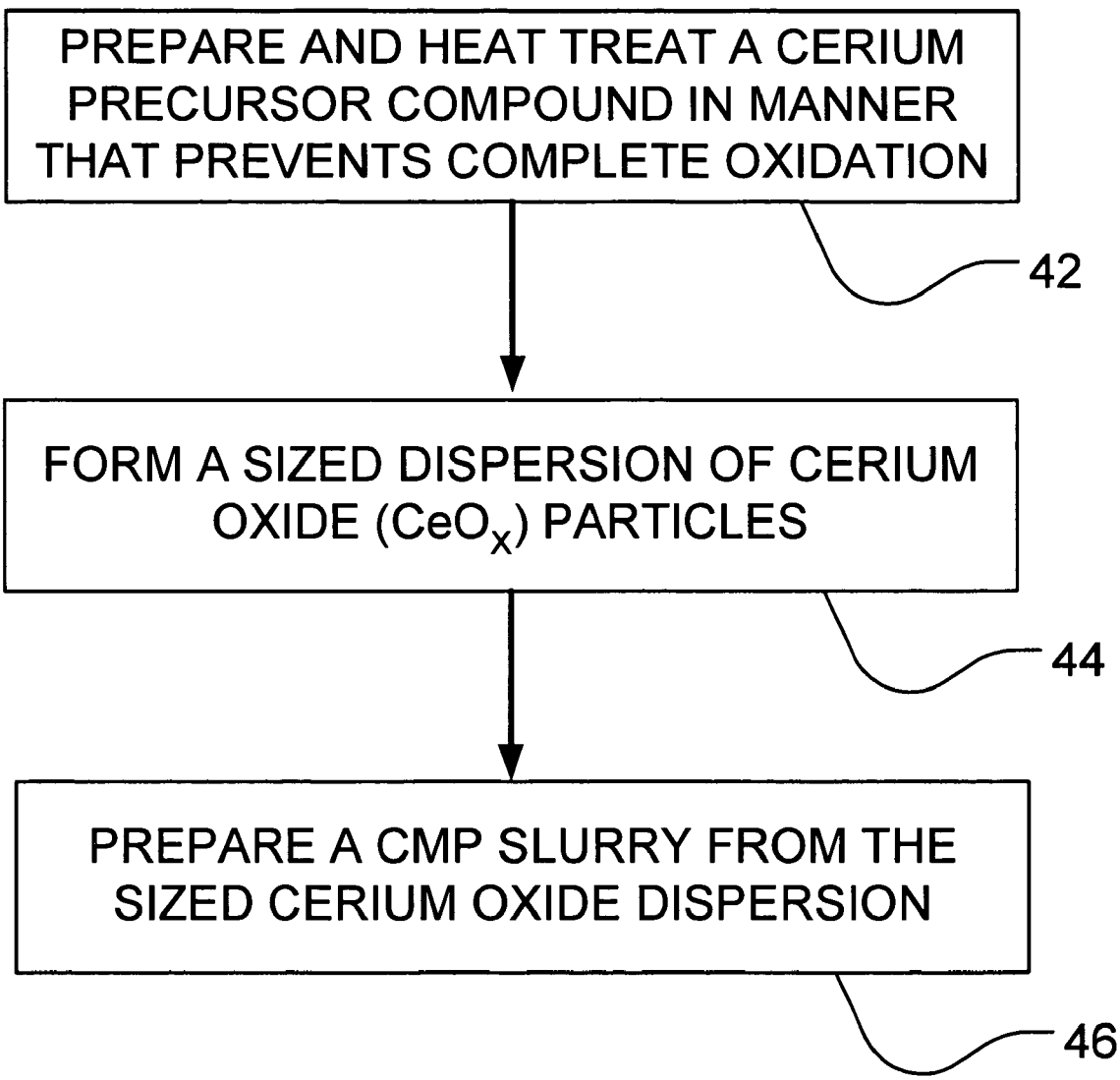
FIG. 8 is a flowchart illustrating another exemplary method of forming a CMP slurry according to the invention.

As illustrated in FIG. 7, in step 36, a cerium oxide slurry is formed by mixing the dispersion including the cerium oxide abrasive particles with another aqueous solution or suitable additives in a ratio sufficient to form a CMP slurry composition having a desired abrasive content, typically between about 1 and 10 wt % of the final CMP slurry composition. Accordingly, the relative volume ratios of the dispersion, the additive agents (if any) and any additional water may be adjusted to provide that the abrasive and additive(s) are present in the final CMP slurry composition at concentrations within target ranges. 100481 As illustrated in FIG. 8, in step 42, the cerium precursor compound is heated to and maintained at or near the heat treatment temperature of between about 710° C. and about 760° C. under an oxidizing atmosphere and under process conditions sufficient to prevent the complete oxidation of the cerium according to the exemplary method described above in connection with FIG. 6. As illustrated in FIG. 8, in step 44, a sized dispersion including the cerium oxide abrasive particles may be formed by dispersing the cerium oxide produced in step 42 in an aqueous solution and separating the particles by size according to the exemplary method described above in connection with FIG. 6.

As illustrated in FIG. 8, in step 46, a cerium oxide slurry is formed by mixing the dispersion including the cerium oxide abrasive particles with another aqueous solution or suitable additives in a ratio sufficient to form a suitable CMP slurry composition having a desired abrasive content, typically between about 1 and 10 wt % of the final CMP slurry composition. Accordingly, the relative volume ratios of the dispersion, the additive agents and any additional water will be adjusted to provide that the abrasive and additives are present in the final CMP slurry composition at concentrations within target ranges.

Figure 9:
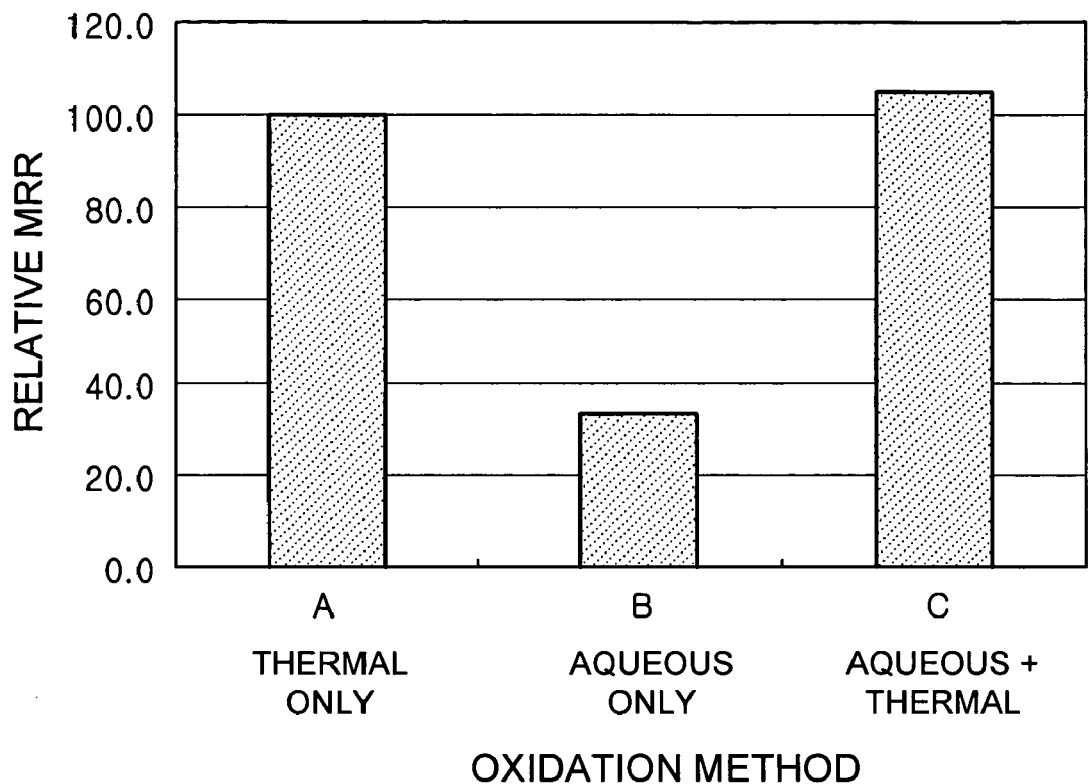
FIG. 9 is a graph illustrating the relative MMR achieved by utilizing various oxidation techniques.

As illustrated in FIG. 9, the method in which the cerium is oxidized affects the crystallinity of the particles and, consequently, the material removal rates that can be obtained with those particles under substantially identical CMP process conditions. As reflected in the graph, the particles in used in run "A" were formed by heating a ceria precursor in a furnace at a temperature of 780° C., the particles used in run "B" were formed by a conventional liquefied method in which the ceria precursor is dissolved and oxidized in an aqueous solution, and the particles used in run "C" were formed by heating particles formed by a process corresponding to run "B" at a temperature of 780° C. for 3 hours under air at atmospheric pressure.

The relative removal rates for the A, B and C cerium oxide abrasive particles were obtained by polishing a PE-TEOS layer formed on a semiconductor substrate using slurries prepared from the respective polishing particles. For the purpose of comparison, the material removal rates for the PE- TEOS layer have been standardized with the material removal rate achieved using the "A" particles being arbitrarily set to 100 and the values for the "B" and "C" particles adjusted accordingly to reflect their relative performance. As evidenced by the poor performance of the "B" particles, the liquefied oxidation method does not produce a ceria oxide structure having sufficient crystallinity, resulting in a decreased material removal rate. As reflected by the material removal rate performance of the "A" and "C" particles, a heat treatment at a temperature sufficient to promote crystallization significantly improves the performance of the abrasive particles.

FIRST EXAMPLE

As reflected below in TABLE 1, the average primary cerium oxide particle size, the average secondary cerium oxide particle in the slurry and the relative material removal rates are provided for cerium oxide abrasive particles produced at different heat treatment temperatures. In preparing each of the samples, 500 g of a cerium precursor, $Ce_2(CO_3)_3$, was heated in air at atmospheric pressure for three hours to form cerium oxide. The heat treatment temperatures for samples 1-5 were 650° C., 700° C., 750° C., 800° C. and 900° C. respectively.

TABLE 1

|  | Heating Temp (° C.) | Avg Particle Size (Primary) (nm) | Avg Particle Size (Secondary) (nm) | Relative Polishing Speed (%) |
|---|---|---|---|---|
| Sample 1 | 900 | 71 | 371 | 98 |
| Sample 2 | 800 | 51 | 343 | 90 |
| Sample 3 | 750 | 46 | 275 | 107 |
| Sample 4 | 700 | 38 | 367 | 96 |
| Sample 5 | 650 | 22 | 348 | 100 |

Figure 10:
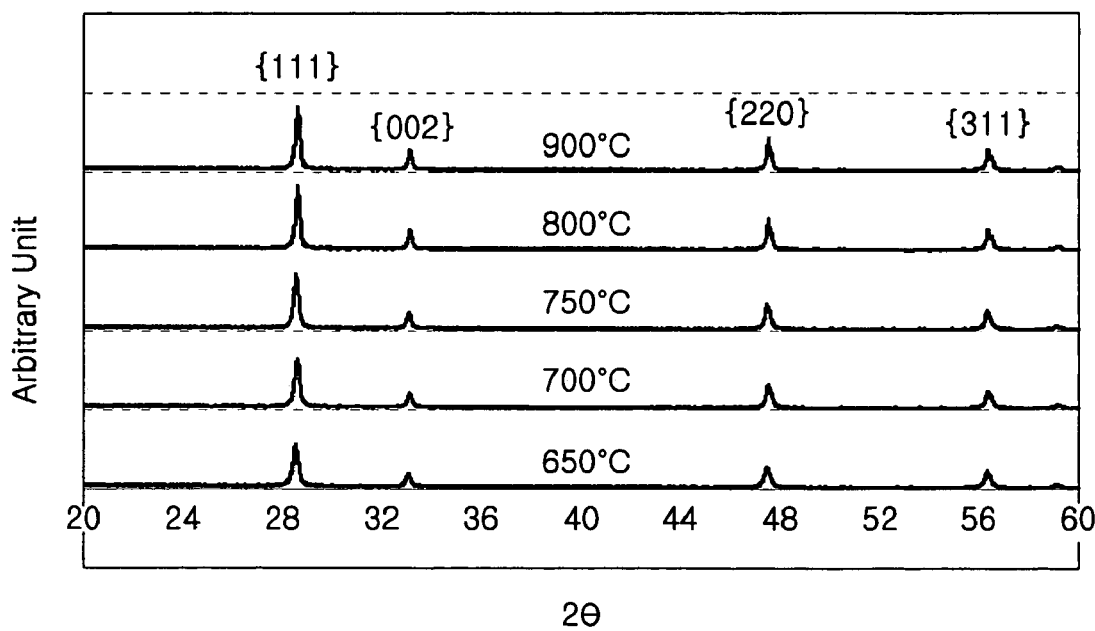
FIG. 10 is a graph illustrating X-Ray Diffraction ("XRD") data reflecting the relative crystallinity of $CeO_x$ particles produced under different processing conditions.

Reproduced in FIG. 10 is X-ray diffraction (XRD) data generated from polishing particles from each of the samples 1-5 listed in TABLE 1. The face directions or planes of the crystalline cerium oxide within the respective polishing particles (specifically the {111}, {002}, {220} and {311} crystalline planes) are reflected in corresponding peaks in the XRD data. A FWHM (full width at half maximum) value was calculated from the diffraction results illustrated in FIG. 10 and correlated to the average crystallization size within the polishing particle using a conventional method as detailed in Cullity, B. D., "Elements of X-ray diffraction, "Elements of X-ray diffraction", 3rd Ed. (2001) Prentice Hall, the contents of which are hereby incorporated, in its entirety, by reference. As reflected in the XRD data of FIG. 10 and the data presented in TABLE 1, as the heat treatment temperature is increased from 650° C. to 900° C., the average crystallization particle size (i.e., primary particles of FIG. 3A) increased from 22 nm to 71 nm.

An aqueous slurry solution containing the polishing particle was then formed by combining the cerium oxide particles obtained after the heat treatment, D.I. water and a dispersion agent and agitating the mixture at about 25° C. for about one hour, after which the mixture was stirred at 1800 rpm for 100 minutes to form a dispersion of the polishing particles in the aqueous solution. This dispersion was then separated in a centrifuge operating at 150 rpm for about 90 minutes. Particles having a diameter of about 1 µm or greater were then removed and the remaining particles were filtered using a filter having a nominal pore size of 0.5 µm to obtain a dispersion predominately containing cerium oxide particles having a major dimension no greater than about 0.5 µm. This initial dispersion was then further diluted with D.I. water to obtain a dispersion in which the cerium oxide particles are present at about 5 wt %. The mean diameter size of the secondary particles in the final dispersion solutions obtained from the samples 1-5 were, as reported in TABLE 1, 348 nm, 367 nm, 275 nm, 343 nm and 371 nm for the samples prepared at heat treatment temperatures of 650° C., 700° C., 750° C., 800° C. and 900° C. respectively.

A series of exemplary CMP slurries were then prepared by mixing the 5 wt % dispersion solutions of the various cerium oxide abrasive particles with additional D.I. water and an additive agent solution at a volume ratio of 1:3:3 to form a range of corresponding slurries suitable for insulator CMP evaluation. Sample semiconductor wafers were prepared by forming a PE-TEOS layer having a thickness of about 6000 Å. The thickness of the PE-TEOS layer was measured on the sample wafers, before and after a 90 second CMP process using the respective CMP slurry compositions to evaluate the relative material removal rates obtained with the various slurry compositions. The calculated material removal rates were then standardized with the material removal rate for the cerium oxide prepared at the heat treatment temperature of 650° C. being set to 100 and the relative material removal rates obtained using the other samples adjusted to illustrate their relative magnitude as reported above in TABLE 1.

As reflected in the data presented and discussed above, the crystallization size of the cerium oxide abrasive particle, i.e., the primary particle size, depends on the heat treatment conditions. The material removal rate, also referred to as the polishing speed, is, in turn, affected by the crystallization size of the cerium oxide abrasive particle and the mean particle size, i.e., the secondary particle size of the cerium oxide particles in the dispersion.

SECOND EXAMPLE

In order to investigate further the factors affecting the material removal rate, a range of sample cerium oxide abrasive particle dispersions, samples 3-1 to 3-3 as listed below in TABLE 2, were prepared at identical heat treatment temperatures, specifically 750° C., resulting in a uniform primary particle size of about 46 nm, but with varying degrees of agitation during the formation of the dispersion to obtain varying secondary particle sizes in the corresponding CMP slurries.

These slurries were then used in a series of 30 second CMP processes on PE-TEOS wafers to obtain the relative material removal rates. As reflected in TABLE 2, as the dispersion time is decreased, the secondary particles remain relatively large, but increasing the dispersion time is sufficient to reduce the size of the secondary particles. It will be appreciated by those of skill in the art that various conventional dispersion techniques may also be employed to increase the intensity of the agitation or disruption of the particles and thereby obtain smaller secondary particles and/or reduce the processing time necessary to obtain secondary particles within a similar size distribution. Similarly, in some instances it may be desirable to process the cerium oxide abrasive particles, at least partially, in a "dry" state using a device such as a ball mill to reduce the size of the particles before forming the dispersion.

TABLE 2

| Sample | Dispersion Duration | Mean Particle Size (nm) | Relative Polishing Speed (%) |
|---|---|---|---|
| 3-1 | Low | 371 | 119 |
| 3-2 | Medium | 343 | 107 |
| 3-3 | High | 275 | 89 |

As reflected in the data presented in TABLE 2 above, a reduction in the average secondary particle size from 371 nm to 275 nm, a reduction of about 25%, correlated generally with the observed reduction in the material removal rate from 119 to 89, again about 25%. This indicates that, within this range, the material removal rate or polishing speed is a substantially direct function of the mean secondary particle size in the dispersion and, further, that the mean particle size may be affected by the dispersion process and/or duration.

THIRD EXAMPLE

To further investigate factors affecting polishing speed further, another series of CMP slurries, listed in TABLE 3 as samples 6 to 9, were prepared using different heat treatment temperatures to obtain cerium oxide particles having a range of primary particle sizes and then dispersing these cerium oxide particles in a manner sufficient to obtain a relatively narrow range of average secondary particle sizes. Corresponding slurry compositions were then prepared and used for the CMP processing of PE-TEOS semiconductor wafers to obtain the relative removal rate information reflected in TABLE 3.

TABLE 3

| Sample | Heat Treatment Temperature (° C.) | Primary Particle Size (nm) | Secondary Particle Size (nm) | Relative Polishing Speed (%) |
|---|---|---|---|---|
| 6 | 670 | 23 | 217 | 90.4 |
| 7 | 710 | 26 | 209 | 92.6 |
| 8 | 750 | 29 | 227 | 100.0 |
| 9 | 800 | 36 | 223 | 109.7 |

As noted above, in these examples the dispersion duration of the dispersion solution formation process for the various cerium oxide samples was adjusted to obtain mean diameter sizes of the polishing particle in the final slurry that were fairly uniform, averaging between about 210 and 225 nm, despite the production of the cerium oxide particles at the various indicated heat treatment temperature of 670° C. to 800° C. Further, in this instance the concentration of oxygen in the heat treatment ambient was reduced by the introduction of $N_2$ gas into the furnace at a flow rate of about 3 liters/hour during the heat treatment process. By reducing the oxygen in the ambient during the heat treatment process, the oxidation of the cerium precursor can more easily be terminated before the cerium has been completely oxidized to $CeO_2$. This incomplete oxidation tends to result in an increased number of crystalline defects, as result of the missing oxygen atoms, thereby reducing the effective strength of the resulting $CeO_x$ cerium oxide particle.

As reflected in TABLE 3, the cerium oxide abrasive particles prepared at different heat treatment temperatures between 670° C. and 800° C., which resulted in increasing primary particle sizes, produced a corresponding increase in the relative polishing speed in the range of about 20 percent (90.4 to 109.7) despite secondary particles sizes that are much more uniform.

FOURTH EXAMPLE

Figure 11:
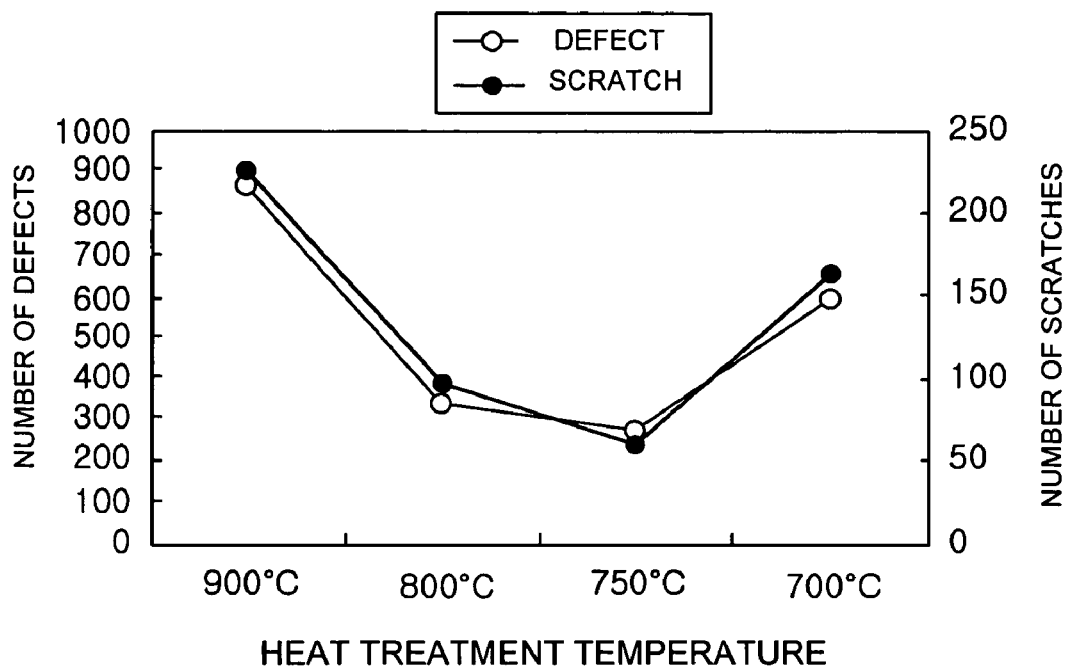
FIG. 11 is a graph illustrating relative performance of $CeO_x$ particles produced under different processing conditions.

The cerium oxide abrasive particles prepared according to samples 1-4 as described above were used to prepare slurry compositions and conduct 30 second CMP processes in accord with the procedure outlined above in the Second Example. The polished wafers were then examined for polishing defects of 0.3 μm or greater on the surface of the PE-TEOS layer formed on the wafer. The sample wafers were polished for 30 seconds using the sample slurry compositions, then cleaned using a conventional brush washing using HF diluted with D.I. water at a volume ratio of 200:1 and PVA (polyvinyl alcohol). The polished wafers were then dipped in a HF wet bath diluted with D.I. water at a volume ratio of 100:1 for 150 seconds, after which the sample wafers were dried using a spin drying process and evaluated for defects. The results of this evaluation are reflected in the graph provided as FIG. 11. As reflected in FIG. 11, maintaining the heat treatment temperature within a range of from about 720° C. to about 800° C. reduces the number of scratches and other defects observed on the polished wafers.

FIFTH EXAMPLE

Additional test wafers were then generated using the CMP process described above in connection with Example 2 using cerium oxide abrasive particles according to those produced in connection with samples 6 to 9 above to form the sample slurry compositions. After polishing, the surface quality of the remaining portion of the PE-TEOS layer was evaluated, with the defects being grouped by size. This data is presented in the graph provided as FIG. 12.

Figure 12:
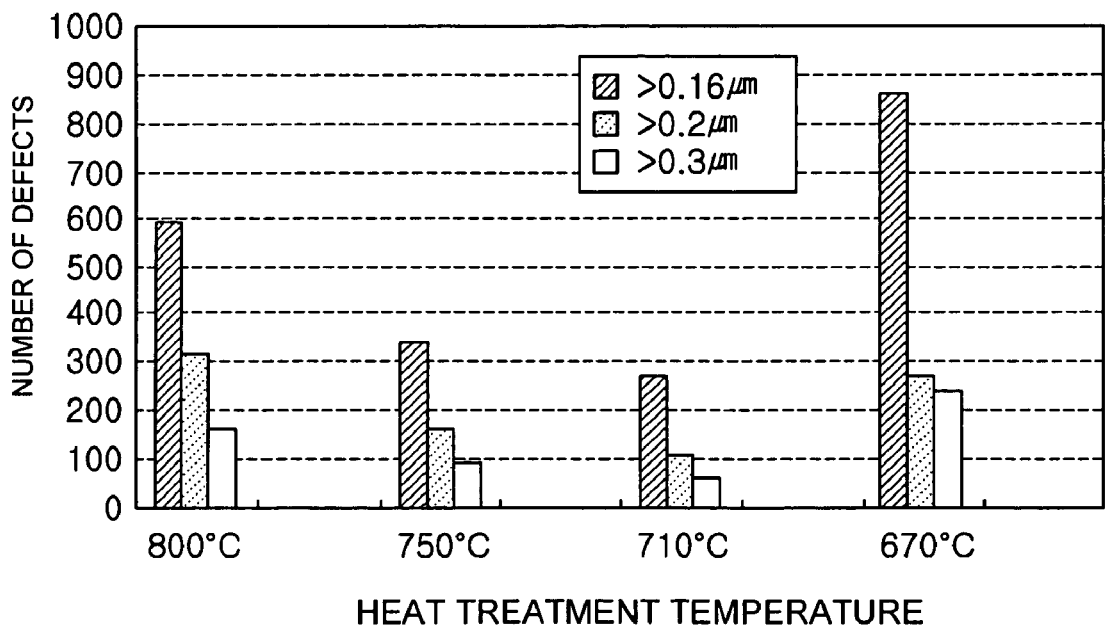
FIG. 12 is a graph illustrating relative defect levels after polishing with $CeO_x$ particles produced under different processing conditions.

As reflected in FIG. 12, varying the crystallization structure of the cerium oxide by reducing the oxygen present in the furnace during the heat treatment process of the ceria precursor using $N_2$ gas as a diluent and varying the heat treatment temperature, produces cerium oxide abrasive particles that exhibit varying defect levels under substantially identical CMP process conditions. These variations in the nature of the abrasive particles were evaluated by inspecting the polished surfaces for polishing defects sized 0.16 μm or greater, 0.2 μm or greater and 0.3 μm or greater. The results of this evaluation generally correspond to the temperature dependence reflected in FIG. 11.

SIXTH EXAMPLE

After forming cerium oxide particle samples 10-14 using the method outlined above in connection with Example 1, with the exception of substituting $Ce(OH)_4$ for $Ce_2(CO_3)_3$ as the cerium precursor, the polishing particles obtained were evaluated to obtain the data reflected below in TABLE 4. Sample CMP slurry compositions were then prepared using the respective polishing particles in accord with the procedure outlined above with respect to Example 2 and used to polish PE-TEOS sample wafers. After polishing and the cleaning process as outlined above in connection with Example 4, the polished surfaces were evaluated with respect to the number and size of polishing defects.

TABLE 4

| Sample | Heat Treatment Temperature (° C.) | Primary Particle Size (nm) | Secondary Particle Size (nm) |
|---|---|---|---|
| 10 | 780 | 45 | 277 |
| 11 | 760 | 37 | 247 |
| 12 | 740 | 33 | 232 |
| 13 | 720 | 30 | 227 |
| 14 | 700 | 26 | 224 |

Figure 13:
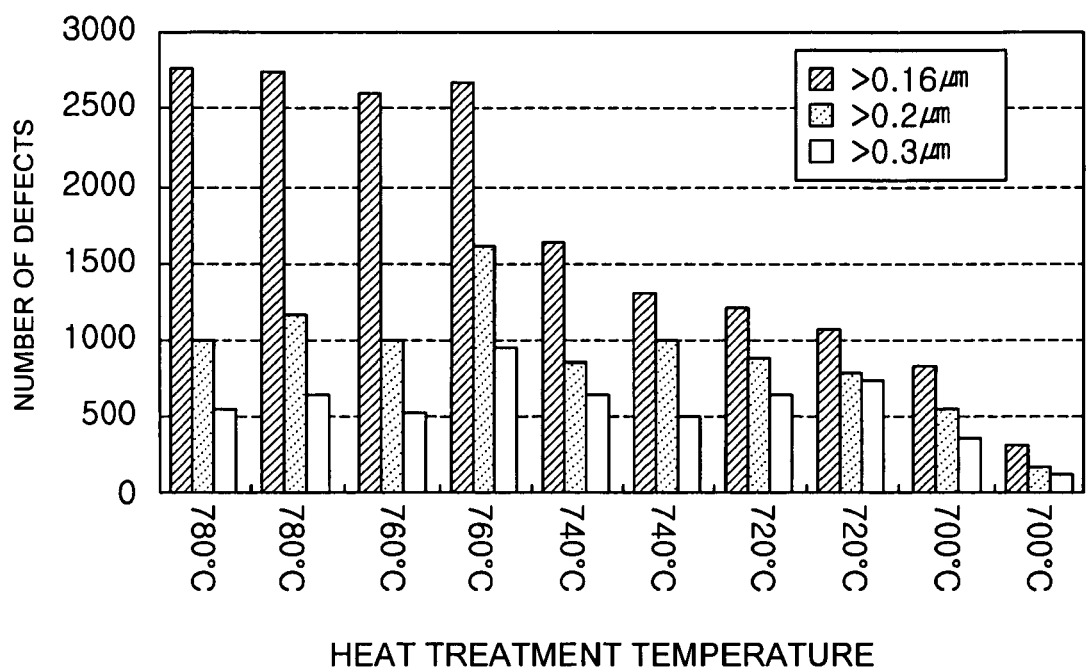
FIG. 13 is a graph illustrating relative defect levels after polishing with $CeO_x$ particles produced under different processing conditions.

The results of this evaluation are reflected in the graph provided as FIG. 13 for polishing defects sized 0.16 μm or greater, 0.2 μm or greater and 0.3 μm or greater. As reflected in the graph of FIG. 13, the number of defects tends to increase for cerium oxide abrasive particles produced at higher heat treatment temperatures, a result also suggested by the data presented in the graph in FIG. 12. A comparison of the test data further suggests that forming cerium oxides that are not completely oxidized, i.e., $CeO_x$ wherein x satisfies the expression $0<x<2$, also tends to decrease the number of polishing defects while generally maintaining acceptable material removal rates.

Although the invention has been described in connection with certain exemplary embodiments, it will be evident to those of ordinary skill in the art that many alternatives, modifications, and variations may be made to the disclosed methods in a manner consistent with the detailed description provided above. Also, it will be apparent to those of ordinary skill in the art that certain aspects of the various disclosed exemplary embodiments could be used in combination with aspects of any of the other disclosed embodiments or their alternatives to produce additional, but not herein illustrated, embodiments incorporating the claimed invention but more closely adapted for an intended use or performance requirements. Accordingly, it is intended that all such alternatives, modifications and variations that fall within the spirit of the invention are encompassed within the scope of the appended claims.

What is claimed is:

1. A method of preparing cerium oxide particles, comprising:
   dehydrating a cerium precursor compound including at least one compound selected from a group consisting of $Ce_2(CO_3)_3$, $Ce(OH)_4$, $CeC_2$, $Ce(O_2C_2H_3)_3$, $CeBr_3$, $CeCl_3$, $CeF_3$, $CeF_4$, $Ce_2(C_2O_4)_3$, $Ce(SO_4)_2$, and $Ce_2(SO_4)_3$ in both hydrated and anhydrous forms:
   heating the cerium precursor compound to a heat treatment temperature of between about 710° C. and about 760° C. under an oxidizing ambient;
   maintaining the cerium precursor compound at the heat treatment temperature for a treatment period sufficient to obtain a treated cerium compound in which substantially all of the cerium precursor compound has been converted to particles of cerium oxide ($CeO_2$);
   separating the particles of cerium oxide according to particle size; and
   forming an aqueous dispersion of cerium oxide particles within a predetermined particle size range.

2. A method of preparing cerium oxide particles according to claim 1, wherein:
   the oxidizing ambient is a gas mixture including at least about 20 volume percent oxygen.

3. A method of preparing cerium oxide particles according to claim 2, wherein:
   the oxidizing ambient has a pressure of at least about 1 atmosphere.

4. A method of preparing cerium oxide particles according to claim 1, wherein:
   the oxidizing ambient is air and has a pressure of about 1 atmosphere.

5. A method of preparing cerium oxide particles according to claim 1, wherein
   the cerium precursor compound has a melting point higher than the heat treatment temperature.

6. A method of preparing cerium oxide particles according to claim 5, wherein:
   the cerium precursor compound is cerium carbonate ($Ce_2(CO_3)_3$), cerium hydroxide ($Ce(OH)_4$) or a mixture thereof.

7. A method of preparing cerium oxide particles according to claim 1, wherein:
   separating the cerium oxide according to particle size utilizes at least one method selected from centrifugation, sedimentation and filtration.

8. A method of preparing cerium oxide particles according to claim 7, wherein:
   separating the cerium oxide according to particle size further involves mechanically disrupting the cerium oxide before utilizing a separation method.

9. A method of preparing cerium oxide particles, comprising:
   heating a cerium precursor compound to a heat treatment temperature of between about 710° C. and about 760° C. under an oxidizing ambient;
   maintaining the cerium precursor compound at the heat treatment temperature for a treatment period sufficient to obtain a treated cerium compound in which the cerium precursor compound has been converted to cerium oxide ($CeO_x$), wherein $0<x<2$;
   separating the cerium oxide according to particle size; and
   forming an aqueous dispersion of cerium oxide particles within a predetermined particle size range.

10. A method of preparing cerium oxide particles according to claim 9, wherein:
    the oxidizing ambient is a gas mixture including no more than about 20 volume percent oxygen.

11. A method of preparing cerium oxide particles according to claim 10, wherein:
    the oxidizing ambient includes air and at least one inert gas.

12. A method of preparing cerium oxide particles according to claim 11, wherein:
    the inert gas is selected from a group consisting of nitrogen, argon, helium and mixtures thereof.

13. A method of preparing cerium oxide particles according to claim 10, wherein:
    the oxidizing ambient has a pressure no greater than about 1 atmosphere.

14. A method of preparing cerium oxide particles according to claim 10, wherein:
    the oxidizing ambient has a pressure of at least about 1 atmosphere.

15. A method of preparing cerium oxide particles according to claim 9, wherein:
    the oxidizing ambient is a gas mixture including no more than about 20 volume percent oxygen.

16. A method of preparing cerium oxide particles according to claim 9, wherein:
    the cerium precursor compound includes at least one compound selected from a group consisting of acetates, carbides, carbonates, chlorides, cyanates, bromides, fluorides, oxalates, sulfates, sulfites, and thiosulfates.

17. A method of preparing cerium oxide particles according to claim 16, wherein:
the cerium precursor compound includes at least one compound selected from a group consisting of $Ce_2(CO_3)_3$, $Ce(OH)_4$, $CeC_2$, $Ce(O_2C_2H_3)_3$, $CeBr_3$, $CeCl_3$, $CeF_3$, $CeF_4$, $Ce_2(C_2O_4)_3$, $Ce(SO_4)_2$, and $Ce_2(SO_4)_3$ in both hydrated an anhydrous forms.

18. A method of preparing cerium oxide particles according to claim 17, further comprising:
dehydrating the cerium precursor compound before heating to the heat treatment temperature.

19. A method of preparing cerium oxide particles according to claim 17, wherein:
the cerium precursor compound is $Ce_2(CO_3)_3$, $Ce(OH)_4$ or a mixture thereof.

20. A method of preparing cerium oxide particles according to claim 9, wherein:
the expression $1<x<2$ is satisfied.

21. A method of preparing cerium oxide particles according to claim 9, wherein:
the expression $1<x<1.9$ is satisfied.

22. A method of preparing cerium oxide CMP slurry, comprising:
heating a cerium precursor compound to a heat treatment temperature of between about 710° C. and about 760° C. under an oxidizing ambient;
maintaining the cerium precursor compound at the heat treatment temperature for a treatment period sufficient to obtain a treated cerium compound in which substantially all of the cerium precursor compound has been converted to cerium oxide ($CeO_2$);
separating the cerium oxide according to particle size;
forming an aqueous dispersion of cerium oxide particles within a predetermined particle size range; and
combining the aqueous dispersion of cerium oxide particles with a second aqueous additive solution in a predetermined proportion.

23. A method of preparing cerium oxide CMP slurry according to claim 22, wherein:
the additive solution includes at least one polymeric acid or a salt thereof.

24. A method of preparing cerium oxide CMP slurry according to claim 23, wherein:
the polymeric acid is selected from a group consisting of polyacrylic acid, polyacrylic-maleic acid and polymethyl vinyl ether-alt maleic acid.

25. A method of preparing cerium oxide CMP slurry according to claim 22, wherein:
the additive solution includes at least two polymeric acids or salts thereof.

26. A method of preparing cerium oxide CMP slurry according to claim 25, wherein:
the polymeric acids have different mean molecular weights and are independently selected from a group consisting of polyacrylic acid, polyacrylic-maleic acid and polymethyl vinyl ether-alt maleic acid.

27. A method of preparing cerium oxide ClAP slurry according to claim 26, wherein:
the additive solution further includes a base.

28. A method of preparing cerium oxide CMP slurry according to claim 27, wherein:
the base includes at least one compound selected from a group consisting of sodium hydroxide, potassium hydroxide, ammonium hydroxide and basic amines.

29. A method of preparing cerium oxide CMP slurry, comprising:
heating a cerium precursor compound to a heat treatment temperature of between about 710° C. and about 760° C. under an oxidizing ambient;
maintaining the cerium precursor compound at the heat treatment temperature for a treatment period sufficient to obtain a treated cerium compound in which a portion of the cerium is not completely oxidized to obtain a cerium oxide ($CeO_x$), wherein $0<x<2$;
separating the cerium oxide according to particle size; and
forming an aqueous dispersion of cerium oxide particles within a predetermined particle size range to produce the CMP slurry.

30. A method of preparing cerium oxide CMP slurry according to claim 29, further comprising:
introducing an additive solution into the CMP slurry wherein the additive solution includes at least one polymeric acid or a salt thereof.

31. A method of preparing cerium oxide CMP slurry according to claim 30, wherein:
the polymeric acid is selected from a group consisting of polyacrylic acid, polyacrylic-maleic acid and polymethyl vinyl ether-alt maleic acid.

32. A method of preparing cerium oxide CMP slurry according to claim 30, wherein:
the additive solution includes at least two polymeric acids or salts thereof.

33. A method of preparing cerium oxide CMP slurry according to claim 32, wherein:
the polymeric acids have different mean molecular weights and are independently selected from a group consisting of polyacrylic acid, polyacrylic-maleic acid and polymethyl vinyl ether-alt maleic acid.

34. A method of preparing cerium oxide CMP slurry according to claim 33, wherein:
the additive solution further includes a base.

35. A method of preparing cerium oxide CMP slurry according to claim 34, wherein:
the base includes at least one compound selected from a group consisting of sodium hydroxide, potassium hydroxide, ammonium hydroxide and basic amines.

36. A method of planarizing a substrate comprising:
placing the substrate on a carrier;
urging a primary surface of the substrate against a pad surface while generating relative motion between the substrate and the pad;
applying a slurry composition to the pad so that a portion of the slurry composition is between the primary surface and the pad surface, the slurry composition cooperating with the pad surface to remove an upper portion of the substrate;
wherein the slurry composition includes cerium oxide particles, substantially all of which are within a predetermined size range, the cerium oxide particles having been manufactured by heating a cerium precursor compound to a heat treatment temperature of between about 710° C. and about 760° C. under an oxidizing ambient;
maintaining the mixture at the heat treatment temperature for a treatment period sufficient to obtain a treated cerium compound in which substantially all of the cerium precursor compound has been converted to cerium oxide ($CeO_x$), wherein $0<x<2$;

separating the cerium oxide according to particle size;
forming an aqueous dispersion of cerium oxide particles within a predetermined particle size range; and
combining the aqueous dispersion of cerium oxide particles with a second aqueous additive solution in a predetermined proportion to form the slurry composition.

37. A method of planarizing a substrate according to claim 36, wherein:
substantially all of the cerium precursor compound is converted to cerium oxide ($CeO_x$), wherein $1<x<1.9$.

* * * * *